(12) United States Patent
Greenberg

(10) Patent No.: US 11,042,783 B2
(45) Date of Patent: Jun. 22, 2021

(54) LEARNING AND APPLYING EMPIRICAL KNOWLEDGE OF ENVIRONMENTS BY ROBOTS

(71) Applicant: X Development LLC, Mountain View, CA (US)

(72) Inventor: Alexa Greenberg, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/734,285

(22) Filed: Jan. 3, 2020

(65) Prior Publication Data

US 2020/0143207 A1   May 7, 2020

Related U.S. Application Data

(63) Continuation of application No. 15/832,705, filed on Dec. 5, 2017, now Pat. No. 10,572,775.

(51) Int. Cl.
*G06K 9/62* (2006.01)
*G06N 3/04* (2006.01)
(Continued)

(52) U.S. Cl.
CPC ............ *G06K 9/6262* (2013.01); *B25J 9/163* (2013.01); *B25J 9/1697* (2013.01);
(Continued)

(58) Field of Classification Search
CPC .... G06K 9/6262; G06K 9/00664; G06K 9/32; G06T 7/97; B25J 9/163; B25J 19/023;
(Continued)

(56) References Cited

U.S. PATENT DOCUMENTS 7,015,831 B2   3/2006   Karlsson et al.
9,020,637 B2   4/2015   Schnittman
(Continued)

OTHER PUBLICATIONS

Abdo, N. et al. (May 2015). Robot, organize my shelves! Tidying up objects by predicting user preferences. In Robotics and Automation (ICRA), 2015 IEEE International Conference on (pp. 1557-1564). IEEE. May 2005.
(Continued)

*Primary Examiner* — Jingge Wu
(74) *Attorney, Agent, or Firm* — Middleton Reutlinger

(57) ABSTRACT

Techniques described herein relate to generating a posteriori knowledge about where objects are typically located within environments to improve object location. In various implementations, output from vision sensor(s) of a robot may include visual frame(s) that capture at least a portion of an environment in which a robot operates/will operate. The visual frame(s) may be applied as input across a machine learning model to generate output that identifies potential location(s) of an object of interest. The robot's position/pose may be altered based on the output to relocate one or more of the vision sensors. One or more subsequent visual frames that capture at least a not-previously-captured portion of the environment may be applied as input across the machine learning model to generate subsequent output identifying the object of interest. The robot may perform task(s) that relate to the object of interest.

20 Claims, 10 Drawing Sheets

(51) Int. Cl.
*G06N 3/08* (2006.01)
*G06K 9/32* (2006.01)
*G06T 7/00* (2017.01)
*G06K 9/00* (2006.01)
*B25J 9/16* (2006.01)
*G05B 13/02* (2006.01)

(52) U.S. Cl.
CPC ....... *G05B 13/027* (2013.01); *G06K 9/00664* (2013.01); *G06K 9/32* (2013.01); *G06N 3/04* (2013.01); *G06N 3/0454* (2013.01); *G06N 3/08* (2013.01); *G06N 3/084* (2013.01); *G06T 7/97* (2017.01); *G05B 2219/33038* (2013.01); *G05B 2219/39046* (2013.01); *G05B 2219/39543* (2013.01); *G06T 2207/20081* (2013.01)

(58) Field of Classification Search
CPC ....... B25J 9/1656; B25J 9/1697; G06N 20/00; G06N 3/08; G06N 3/084; G05B 13/027
See application file for complete search history.

(56) References Cited

U.S. PATENT DOCUMENTS

| | | | |
|---|---|---|---|
| 10,317,240 B1 * | 6/2019 | Di Pietro | G06N 20/00 |
| 10,417,781 B1 | 9/2019 | Konolige et al. | |
| 2013/0041508 A1 | 2/2013 | Hu et al. | |
| 2013/0215264 A1 | 8/2013 | Soatto et al. | |
| 2013/0343641 A1 | 12/2013 | Mnih et al. | |
| 2015/0269439 A1 | 9/2015 | Versace et al. | |
| 2015/0347846 A1 | 12/2015 | Guzm N-Rivera et al. | |
| 2016/0167226 A1 | 6/2016 | Schnittman | |
| 2017/0024877 A1 | 1/2017 | Versace et al. | |
| 2017/0083772 A1 | 3/2017 | Kim et al. | |
| 2017/0252924 A1 | 9/2017 | Vijayanarasimhan et al. | |
| 2017/0334066 A1 | 11/2017 | Levine et al. | |
| 2018/0188059 A1 | 7/2018 | Wheeler et al. | |
| 2018/0253866 A1 | 9/2018 | Jain et al. | |
| 2018/0361589 A1 | 12/2018 | Paquin et al. | |
| 2019/0065856 A1 | 2/2019 | Harris et al. | |
| 2019/0091865 A1 | 3/2019 | Amacker et al. | |
| 2019/0102621 A1 * | 4/2019 | Flohr | G06N 20/00 |
| 2019/0102674 A1 * | 4/2019 | Kwant | G06F 16/93 |
| 2019/0102692 A1 * | 4/2019 | Kwant | G06N 20/00 |
| 2019/0126487 A1 | 5/2019 | Benaim et al. | |
| 2019/0146521 A1 | 5/2019 | Cui et al. | |
| 2019/0147220 A1 | 5/2019 | McCormac et al. | |
| 2019/0156204 A1 * | 5/2019 | Bresch | G06N 3/0454 |
| 2019/0156485 A1 * | 5/2019 | Pfeiffer | G06N 20/00 |
| 2019/0184571 A1 | 6/2019 | Hou | |
| 2019/0205758 A1 | 7/2019 | Zhu et al. | |
| 2019/0228268 A1 | 7/2019 | Zhang et al. | |

OTHER PUBLICATIONS

Aydemir, A. et al. (May 2011). Search in the real world: Active visual object search based on spatial relations. In Robotics and Automation (ICRA), 2011 IEEE International Conference on (pp. 2818-2824). IEEE. May 2011.

Aydemir, A. et al. "Plan-based Object Search and Exploration using Semantic Spatial Knowledge in the Real World." In ECMR, pp. 13-18. 2011. 2011.

Aydemir, A. et al. (Oct. 2012). Exploiting and modeling local 3d structure for predicting object locations. In Intelligent Robots and Systems (IROS), 2012 IEEE/RSJ International Conference on (pp. 3885-3892). IEEE. Oct. 2012.

Björkman, M. et al. (2006). Vision in the real world: Finding, attending and recognizing objects. International Journal of Imaging Systems and Technology, 16(5), 189-208. 2006.

Choi, M. J. et al. (Jun. 2010). Exploiting hierarchical context on a large database of object categories. In Computer vision and pattern recognition (CVPR), 2010 IEEE conference on (pp. 129-136). IEEE. Jun. 2010.

Choi, P. P. et al. (2006). Learning and predicting moving object trajectory: a piecewise trajectory segment approach. Robotics Institute, 18 pages. 2006.

Jiang, Y. et al. (2012). Learning object arrangements in 3d scenes using human context. arXiv preprint arXiv:1206.6462.; 8 pages. 2012.

Nyga, D. et al. (May 2014). PR2 looking at things—Ensemble learning for unstructured information processing with Markov logic networks. In Robotics and Automation (ICRA), 2014 IEEE International Conference on (pp. 3916-3923). IEEE. 2014.

Pangercic, D. et al. (Oct. 2010). Combining perception and knowledge processing for everyday manipulation. In Intelligent Robots and Systems (IROS), 2010 IEEE/RSJ International Conference on (pp. 1065-1071). IEEE. Oct. 2010.

Schuster, M. J. et al. (May 2012). Learning organizational principles in human environments. In Robotics and Automation (ICRA), 2012 IEEE International Conference on (pp. 3867-3874). IEEE. 2012.

Schuster, M. J. et al. (2012). Conference Paper—Learning organizational principles in human environments. Proceedings—IEEE International Conference on Robotics and Automation. 3867-3874. 10.1109/ICRA.2012.6224553. 2012.

Sjöö, K. et al. (2012). Topological spatial relations for active visual search. Robotics and Autonomous Systems, 60(9), 1093-1107. 2012.

Lin, Y. et al. "Planning on Searching Occluded Target Object with a Mobile Robot Manipulator"; 2015 IEEE International Conference on Robotics and Automation (ICRA), pp. 3110-3115; May 26, 2015 May 26, 2015.

Lim, G. et al. "Ontology-Based Unified Robot Knowledge for Service Robots in Indoor Environments;" IEEE Transactions on Systems, Man and Cybernetics. Part A: Systems and Humans, vol. 41, No. 3; pp. 492-509; May 1, 2011 May 1, 2011.

Meger, D. et al. "Curious George: An attentive semantic robot;" Robotics and Autonomous Systems, Elsevier Science Publishers, vol. 56, No. 6; pp. 503-511; Jun. 30, 2008 Jun. 30, 2008.

European Patent Office; International Search Report and Written Opinion of Ser. No. PCT US/2018/063851; 15 pages; dated Mar. 25, 2019 Mar. 25, 2019.

* cited by examiner

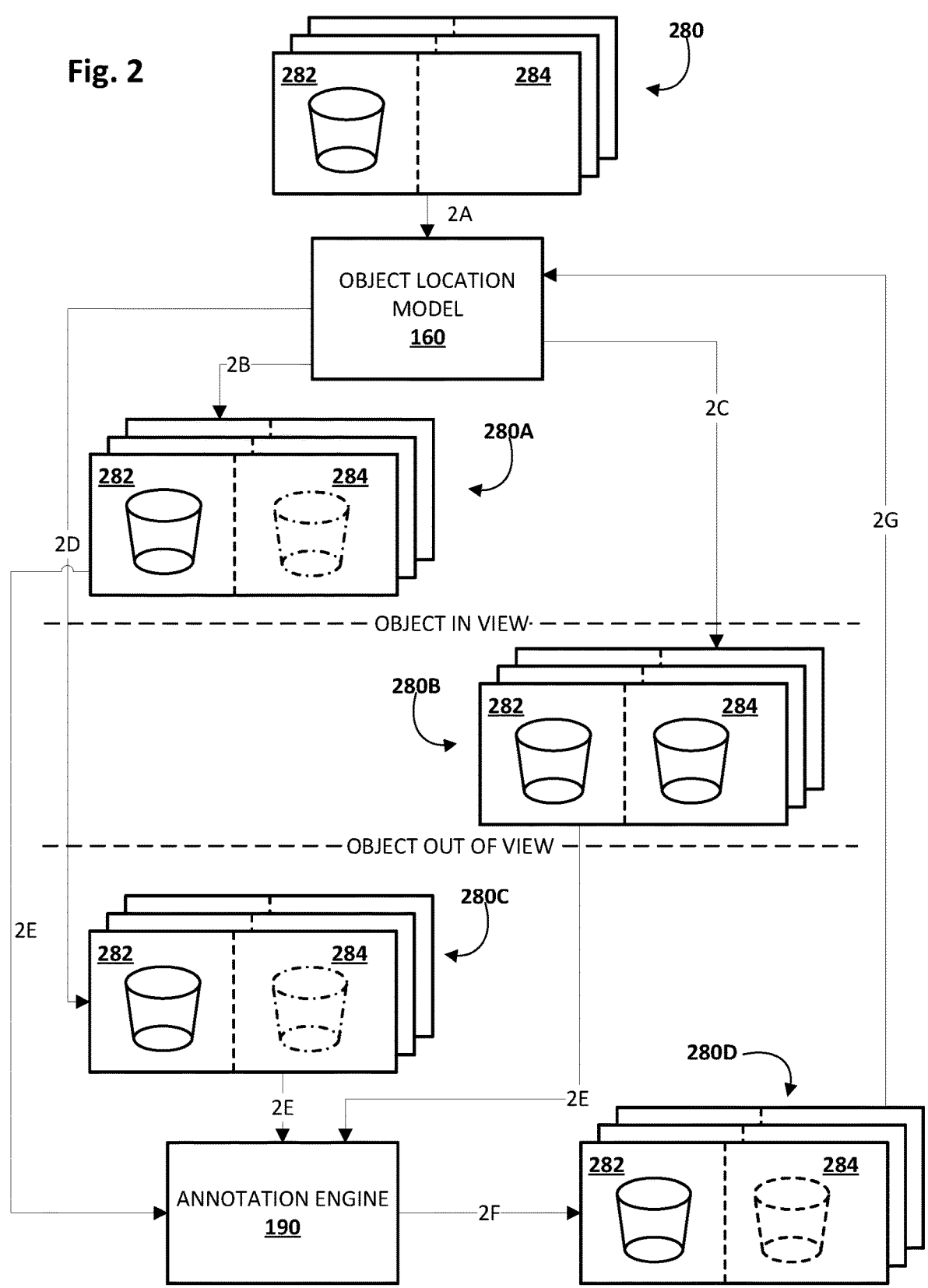

LEARNING AND APPLYING EMPIRICAL KNOWLEDGE OF ENVIRONMENTS BY ROBOTS

BACKGROUND

Robots are becoming more capable of performing mundane chores such as cleaning a room, taking out the trash, and other chores that require robots to interact with everyday objects. While robots are adept at identifying and/or locating objects that are directly in view of one or more vision sensors integrated with the robots or elsewhere, they are less efficient in locating and identifying objects that are not directly in view. Without being provided with preexisting knowledge about where objects of interest (e.g., object to be acted upon by robots) are located, conventional robots may be required to perform time-consuming operations, such as simultaneous localization and mapping ("SLAM"), to exhaustively map an environment and empirically gain knowledge regarding locations of specific objects of interest. These operations may expend resources such as power, processing cycles, memory, and/or time that might be better used for other purposes or at least conserved. Moreover, in an environment such as a home or business, robots performing SLAM and other similar knowledge-gaining operations may be disruptive.

Humans tend to place particular types of objects in predictable locations. For example, trash bins are often positioned beneath or to the side of a desk or table. Dishware and other kitchen objects are often positioned on horizontal surfaces such as table tops and/or counter tops. When a human wishes to interact with an object, the human does not need to exhaustively scan an environment to locate/identify the object. Instead, the human uses a posteriori knowledge gained over a lifetime to narrow the search space to locations at which the human knows the object of interest is likely to be. In this way, humans remain far more efficient than conventional robots in finding objects of interest.

SUMMARY

The present disclosure is generally directed to methods, apparatus, and computer-readable media (transitory and non-transitory) for automatically generating a posteriori knowledge about where objects are typically located within environments, e.g., relative to other objects, and leveraging this knowledge to enable robots to more efficiently and less disruptively locate and act upon objects within environments. In various implementations, an object of interest may be identified, e.g., as an object to be interacted with by a robot. For example, a human may provide a command to a robot to place a piece of trash into the nearest trash bin. The robot may lack specific knowledge about locations of trash bins in the area. However, using techniques described herein, the robot may avoid exhaustively exploring the environment to locate the nearest trash bin, instead relying on a posteriori knowledge gained over time about similar objects of interest, i.e., where trash bins are typically located.

In some implementations, a machine learning model such as a convolutional neural network may be trained to generate output indicative of where, in visual frames captured by vision sensor(s) (e.g., RGB cameras, RGBd cameras, stereographic cameras, laser scanners, monographic camera, etc.) integral with the robot or elsewhere, objects of interest are likely to be located. In the example of the trash bin, the machine learning model may be trained to provide output indicative of other objects, such as horizontal and/or vertical surfaces (e.g., desk tops), to which trash bins are often proximate (and hence, may conceal a trash bin from a direct line of sight of optical sensor(s)).

Then, optical sensor data captured by, for instance, an optical sensor integral with the robot, may be applied as input across the trained machine learning model to generate output that may be used to help the robot more quickly locate an instance of the object of interest, such as a trash bin. For example, in various implementations, the output generated from the machine learning model may identify one or more surfaces in a captured portion of an environment that potentially conceal, from a vantage point of the optical sensor(s), an instance of the object of interest. Additionally or alternatively, in some implementations, the output generated from the machine learning model may identify one or more directions off frame that are likely to contain an instance of an object of interest. In some implementations, the output may include pixel-wise probabilities (or point-wise probabilities in the case of point cloud vision data) that an instance of the object of interest is present in an area captured by a visual frame or nearby.

Suppose the robot tasked with depositing the garbage in the nearest trash bin is located in an office of which the robot has little or no prior knowledge (e.g., the robot has not yet mapped the office and objects contained therein). Visual frames captured by an optical sensor integral with the robot may be provided as input to the trained machine learning model, e.g., along with data indicative of the object of interest, namely, a trash bin. In some implementations, the data indicative of the object of interest may be, for instance, a reduced dimensionality embedding that represents the object of interest in its many potential forms. Output may be generated based on application of the input across the machine learning model. If a trash bin is directly depicted (i.e., directly visible from the vantage point of the robot's optical sensor) in the input visual frame, then the pixels associated with the trash bin in the visual frame may be assigned relatively high probabilities, e.g., relative to other pixels of the visual frame.

However, suppose a trash bin is not directly depicted in the input visual frame. Output may be generated from the machine learning model that, for instance, identifies one or more surfaces in the depicted portion of the environment that potentially conceal, from a vantage point of the optical sensor of the robot, an instance of a trash bin. For example, pixels of the visual frame that depict a horizontal surface such as a desk that likely conceals a trash bin may be assigned relative probabilities that are greater than probabilities assigned to other pixels of the visual frame (e.g., pixels depicting the floor). As another example, pixels towards the edge of a vision frame may be assigned higher probabilities if no trash bin is depicted in the vision frame and it is determined using techniques described herein that a trash bin is likely located off frame, e.g., to either side, behind, above, below, etc.

Based on the probabilities output based on the machine learning model, in various implementations, the robot may be maneuvered to a different location within the environment, or reconfigured into a different pose (e.g., hunch down, etc.) so that the optical sensor(s) integral with the robot has a direct view of a likely location of the object of interest, such as behind and/or underneath one or more of the surfaces. Once the robot has a direct view behind/beneath the surface(s), subsequent visual frames captured by the robot's optical sensor(s) may be applied as input across the same machine learning model or a different machine learning model to generate output that either identifies a detected instance of the object of interest (e.g., a trash bin is identified beneath the desk) or indicates that the object of interest was not identified. In the former case, with the instance of the object of interest identified, the robot may perform task(s) that relate to the instance of the object of interest. For example, the robot may place the piece of trash into the trash bin located beneath the desk.

The machine learning model mentioned above may be trained in various ways. In some implementations, training data may take the form of a plurality of training visual frames that are captured, for instance, by robots performing SLAM operations in various environments. For example, a robot with little to no a posteriori knowledge about where objects are typically located may capture the plurality of training visual frames. The plurality of training visual frames may be classified with annotations that indicate, for instance, whether an instance of one or more objects of interest are present in an area captured in the respective training visual frames.

In some implementations, the plurality of training visual frames may be a sequence of frames captured by a robot while it performs, for instance, SLAM operations. Initial frames captured by the robot may not necessarily directly depict an instance of an object of interest, e.g., because from the optical sensor's vantage point, the instance of the object of interest is not in line of sight. However, as the robot traverses the environment, the instance of the object of interest may gradually come into view. At this point, training visual frames directly depicting the instance of the object of interest may be classified with labels that indicate that the instance of the object of interest is present, e.g., with a high probability.

The generation of training data does necessarily stop there, however. Rather, in various implementations, the determined location of the instance of the object of interest may be used to reclassify other training visual frames of the sequence of training visual frames, whether those other frames come before or after the training visual frames that directly depict the object. Suppose the object of interest is a trash bin. As the robot initially scans a room such as an office, the initial visual frames it captures may not depict the trash bin because it is hidden from view beneath a desk. As the robot reconfigures itself and/or maneuvers around the room the trash bin will eventually come into view. Subsequent visual frames captured after the trash bin comes into view and directly depicting the trash can may be labelled accordingly. Then, once the trash bin's location is known, the initial visual frames that did not directly depict the trash bin (because it was concealed from view) may be reclassified, e.g., to indicate that the trash bin is present in an area captured by the initial visual frames (even though it is not directly visible).

For example, an object or surface that initially concealed the trash bin from the robot's line of sight, such as a desktop, may be identified. In some implementations, at least some pixels associated with that concealing object/surface may be assigned pixel-wise probabilities that indicate or suggest that the trash bin is behind the object/surface. In some cases these probabilities may be selected to be somewhat heightened and yet lower than, for instance, probabilities assigned to pixels of other subsequently-captured sensor frames that directly depict the trash bin. In some implementations, all pixels of the desktop may be assigned the same somewhat heightened probability, even though the trash bin is technically only concealed by a portion of the desktop (and not the entire desktop). In other implementations, only those pixels of the desktop that directly concealed the trash bin, and not adjacent pixels of the desktop that did not directly conceal the trash bin, are assigned heightened probabilities. Additionally or alternatively, in some implementations, a gradient of probabilities may be assigned from pixels that directly concealed the trash bin to neighboring pixels. A similar process may be applied to reclassify training visual frames captured later, e.g., after the robot maneuver's/reconfigures itself such that the trash bin is once again removed from the robot's line of sight.

Once the training visual frames are classified and/or reclassified with annotations, they may be applied as input across the aforementioned machine learning model to generate training output. The training output may then be compared to the annotations to train the machine learning model. For example, in implementations in which the machine learning model is a convolutional neural network, differences (or "error") between the output of the convolutional neural network and the annotations may be determined and used to train the convolutional neural network, e.g., using techniques such as back propagation and stochastic/batch gradient descent.

Once the machine learning model is trained, un-annotated visual frames—e.g., captured by a subsequent robot that is tasked with interacting with an instance of a particular object of interest—may be applied as input across the machine learning model to generate new output. This new output may include, for instance, an annotated version of the visual frame that indicates potential location(s) of the object of interest. In some implementations, the annotated version of the visual frame may include pixel-wise probabilities indicating surfaces and/or other objects that may be concealing an instance of an object of interest. For example, pixels associated with a horizontal surface may be assigned (e.g., using one or more channels) somewhat heightened probabilities that suggest a trash bin is potentially located underneath. This may enable the robot configured with selected aspects of the present disclosure to more efficiently search for the object of interest than, say, conventional robots that may be required to perform exhaustive SLAM operations until the object of interest is located.

While many examples described herein include assigning pixel-wise probabilities to identify potential locations of objects of interest, this is not meant to be limiting. Probabilities may be assigned in other manners to other types of data structures. For example, in some implementations, a three-dimensional voxel map of an environment may be maintained, and voxels may be assigned probabilities that correspond to likelihoods that they contain or overlap with an object of interest. For example, voxels in a three-dimensional voxel map that are located underneath a desk or table, and hence are more likely to contain a trash bin, may be assigned relative probabilities that are greater than other voxels of the three-dimensional voxel map.

In various implementations, a method may include the following operations:

determining an object of interest; receiving vision data, the vision data generated based on output from one or more vision sensors of a vision component of a robot, the vision data including one or more visual frames that capture at least a portion of an environment in which a robot operates or will operate; applying one or more of the visual frames as input across a machine learning model to generate output, wherein the output identifies one or more surfaces in the portion of the environment that potentially conceal, from a vantage point of the one or more vision sensors, an instance of the object of interest; altering a position or pose of the robot based on the output to relocate one or more of the vision sensors to have a direct view behind one or more of the surfaces; receiving, from one or more of the vision sensors of the vision component, one or more subsequent visual frames that capture at least a portion of the environment that was previously concealed by the one or more surfaces; applying one or more of the subsequent visual frames as input across the machine learning model to generate subsequent output, wherein the subsequent output identifies the instance of the object of interest; and operating the robot to perform one or more tasks that relate to the instance of the object of interest.

This method and other implementations of technology disclosed herein may each optionally include one or more of the following features.

In various implementations, the machine learning model may take the form of a convolutional neural network. In various implementations, the method may further include receiving a plurality of training visual frames. In various implementations, at least a first subset of the plurality of training visual frames may not directly capture another instance of the object of interest and at least a second subset of the plurality of training visual frames may directly capture the another instance of the object of interest. In various implementations, each given training visual frame of the plurality of training visual frames may be classified with one or more annotations that are indicative of whether the another instance of the object of interest is present in an area captured in the given training visual frame. In various implementations, the method may further include: applying the plurality of training visual frames as input across the machine learning model to generate training output; comparing the training output to the annotations used to classify the plurality of training visual frames; and training the machine learning model based on the comparing.

In various implementations, the plurality of training visual frames may include a sequence that is captured by another vision sensor of a different robot as it is maneuvered around a different environment. In various implementations, each training visual frame of the first subset of the plurality of training visual frames may be classified with respective one or more annotations that indicate a depicted surface behind which the another instance of the object of interest is concealed. In various implementations, the first subset of the plurality of training visual frames may be initially classified with annotations indicating that the another instance of the object of interest is not present in respective areas captured by the first subset of the plurality of training visual frames. In various implementations, the first subset of the plurality of training visual frames may be reclassified with annotations indicating that the another instance of the object of interest is present in the respective areas based on the second subset of the plurality of training visual frames.

In various implementations, the one or more annotations may include pixel-wise probabilities that pixels of the given training visual frame depict a portion of the another instance of the object of interest. In various implementations, the one or more annotations may include voxel-wise probabilities. In various implementations, the input applied across the machine learning model may include a reduced dimensionality embedding of the object of interest.

In another aspect, a method may include the following operations: determining an object of interest; receiving vision data, the vision data generated based on output from one or more vision sensors of a vision component of a robot, the vision data including at least one visual frame that captures at least a portion of an environment in which a robot operates or will operate; applying the at least one visual frame as input across a machine learning model to generate output, wherein the output identifies one or more other portions of the environment that are outside of the portion of the environment captured by the at least one visual frame, wherein the one or more other portions of the environment potentially include an instance of the object of interest; altering a position or pose of the robot based on the output to relocate one or more of the vision sensors to have a direct view of a given other portion of the one or more other portions of the environment; obtaining, from one or more of the vision sensors, at least one subsequent visual frame that captures the given other portion of the environment; applying the at least one subsequent visual frame as input across the machine learning model to generate subsequent output, wherein the subsequent output identifies the instance of the object of interest; and operating the robot to perform one or more tasks that relate to the instance of the object of interest.

In yet another aspect, a method may include: receiving a plurality of training visual frames captured by one or more vision components of one or more robots, wherein at least a first subset of the plurality of training visual frames do not directly capture an instance of an object of interest and at least a second subset of the plurality of training visual frames directly capture the instance of the object of interest, and each given training visual frame of the plurality of training visual frames is classified with one or more annotations that are indicative of whether the instance of the object of interest is present in an area captured in the given training visual frame; applying the plurality of training visual frames as input across a machine learning model to generate training output; comparing the training output to the annotations used to classify the plurality of training visual frames; and training the machine learning model based on the comparing.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 depicts another example process flow, in accordance with various implementations.

DETAILED DESCRIPTION

Techniques described herein relate to more intelligently locating objects of interest in three-dimensional ("3D") environments. While specific implementations described herein relate to efficiently locating trash bins, this is not meant to be limiting. Techniques described herein may be used to more efficiently locate any object of interest. In some implementations, the objects of interest may include generally-known and/or canonical objects, such a trash bins, chairs, kitchenware (e.g., plates, cups, bowls), common office equipment, etc. However, people may also define new objects that may not necessarily be common, and may "teach" robots or other systems how to recognize any object they like, such as specific toy models, household objects that may be relatively uncommon, etc.

Figure 1:
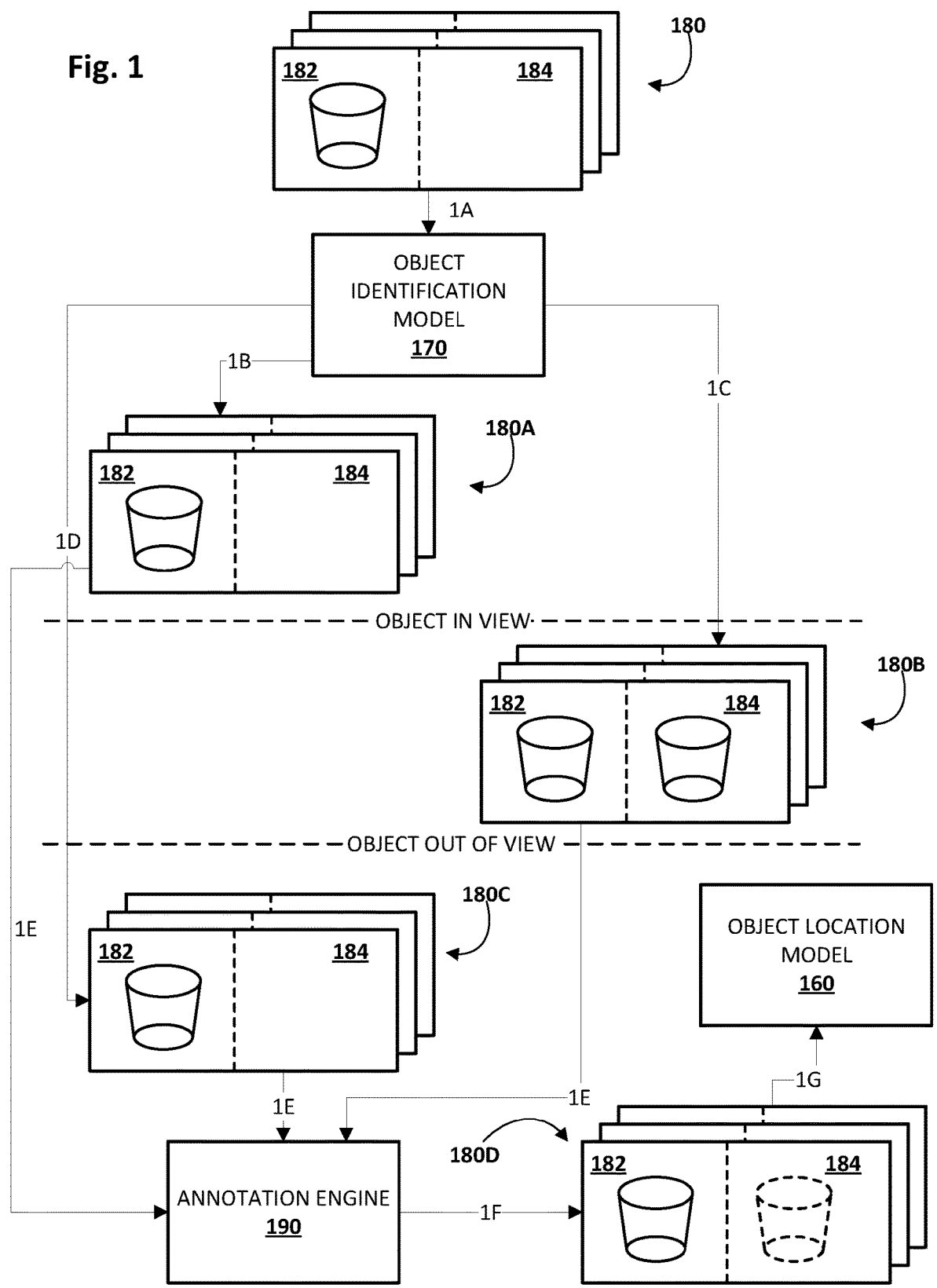
FIG. 1 depicts an example process flow, in accordance with various implementations.

FIG. 1 depicts one example of a process that may occur prior to training of a machine learning model configured with selected aspects of the present disclosure. In FIG. 1 it can be assumed that no a posteriori knowledge of general trash bin locations is yet known. However, it can also be assumed that an object identification model 170 has been trained to identify trash bins. For example, object identification model 170 may include one or more convolutional neural networks and/or other machine learning models that have been trained, for instance, with a plurality of labeled vision frames that capture various types of trash bins.

In FIG. 1, input that is applied across object identification model 170 at step 1A may include some representation 182 of an object of interest—in this case, a trash bin—and one or more vision frames 184. Representation 182 of the object of interest may take various forms. For example, in some implementations, representation 182 of the object of interest may take the form of a reduced-dimensionality embedding associated generally with trash bins. In other implementations, object identification model 170 may be trained to generically identify a multitude of different objects, one which may be trash bins, from vision frame(s) 184. In some such implementations, the input applied across object identification model 170 may simply be vision frames 184, without any input representing a particular object of interest.

A series 180 of inputs may be captured by one or more vision sensors that may or may not be integral with a robot (not depicted in FIG. 1). Examples of vision sensors will be described below. Series 180 of inputs may be captured by the robot, for instance, while the robot maneuvers around an area such as a home or office looking for an object of interest, such as a trash bin. Each captured vision frame 184, and representation 182 if present, may be applied at step 1A as input across object identification model 170 to generate output. The output may be indicative of whether an instance of the object of interest (a trash bin) is detected in the vision frame. For example, in some implementations, the output may include annotations and/or other information that indicates, within each vision frame 184, a location of a detected trash bin. If no trash bin is detected, then there may be no (at least meaningful) output.

For example, as the robot enters a room in which the robot will search for a trash bin, assume that no trash bin is yet visible. As the robot maneuvers around the room to locate a trash bin, any vision frames 184 it captures will be applied at step 1A as input across object identification model 170 to generate output indicating that no trash bin is detected. These vision frames 184 may be persisted (at step 1B), e.g., in memory of the robot or elsewhere, as a "pre-detection" group 180A of vision frames.

Now, suppose after maneuvering around for some time, the robot detects a trash bin, e.g., behind a desk. A dashed line in FIG. 1 labeled "OBJECT IN VIEW" represents a delineation between the pre-detection group 180A of vision frames, in which no trash bin was detected, and a "during detection" group 180B of vision frames 184 in which at least enough of a trash bin is detected to cause output of object identification model 170 to indicate detection of a trash bin. As shown in FIG. 1, during-detection group 180B of vision frames 184 generated from output of object identification model 170 at step 1C include a picture of a trash bin to indicate that a trash bin was detected in the during-detection vision frames 180B (this is for demonstration purposes only; trash bins may have a variety of different appearances and poses). Vision frames 184 of during-detection group 180B include a solid line depiction of a trash bin to signify that the trash bin is actually detected in the vision frame 184. After this point, based on the robot's own pose and/or localization knowledge, the location of the trash bin is known.

Suppose the robot continues to maneuver around the area until the trash bin is no longer in view. This is delineated in FIG. 1 by a second dashed line labeled "OBJECT OUT OF VIEW." When vision frames 184 captured after this point are applied at step 1A as input across object identification model 170, the output generated at step 1D will not include annotations or other information of a detected trash bin. Thus, a "post-detection" group 180C of vision frames 184 may be collected, e.g., in memory.

At some point in time, e.g., after the trash bin's location is detected, one or more vision frames of groups 180A, 180B, and/or 180C may be provided to an annotation engine 190 at step 1E. Annotation engine 190 may be implemented using any combination of hardware and software. Annotation engine 190 may be configured to apply, e.g., based on the known location of the trash bin and/or based on during-detection group 180B of vision frames 184, annotations to vision frames in which the trash bin (or more generally, the object of interest) was not directly detected to indicate the location of trash bin relative to these vision frames.

In FIG. 1, vision frames 184 from pre-detection group 180A and/or post-detection group 180C may be annotated, or other information may be generated such as a vision mask, to convey a location of the trash bin that is not otherwise visible in those vision frames 184. Consequently, at step 1F, a "labeled" group 180D of annotated vision frames 184 may be generated. In FIG. 1, the annotations are represented schematically by a trash bin depicted in dashed lines.

These annotations may be applied (or simply generated) in various ways. In some implementations, the object's detected location may be projected onto the vision frame, such that one or more channels of any effected pixels are altered to include an indication of object presence. For example, in some implementations, pixel-wise annotations may be applied to the vision frame 184 to indicate, e.g., for each pixel or block of pixels, a probability of the trash bin being present. Additionally or alternatively, in various implementations, a separate, "vision mask" may be generated that includes a two- or three-dimensional array of data points that correspond spatially with (i.e. are mapped to) regions of the underlying vision frame 184.

At step 1G, this labeled group 180D of annotated vision frames 184 may be used as training examples to train an object location model 160. Object location model 160 may take various forms, such as one or more convolutional neural networks. In various implementations, vision frames 184 may thereafter be applied as input across object location model 160 to generate output that conveys potential location(s) of an object of interest. In some implementations, the output of object location model 160 may identify one or more surfaces in the portion of the environment captured in the input vision frame that potentially conceal, from a vantage point of the vision sensors, an instance of the object of interest. Additionally or alternatively, in some implementations, the output of object location model 160 may identify one or more other portions of the environment that are outside of the portion of the environment captured by the at least one visual frame and that potentially include an instance of the object of interest. At step 1G, the annotated vision frames 184 of the labeled group 180 may be applied as input to the model, and the annotations may be used (e.g., akin to labeled training data) to train object location model 160, e.g., using techniques such as back propagation and/or stochastic/batch gradient descent.

FIG. 2 depicts a process flow that is very similar to that depicted in FIG. 1, except that in FIG. 2, rather than object identification module 170, object location model 160 is now employed to improve object location efficiency. FIG. 2 depicts one advantage derived from using techniques described herein. Once object location model 160 is at least partially trained to help guide robots more efficiently to locations at which objects of interest are expected, it can be continuously trained based on subsequent data obtained by robots and/or their vision sensors during operation.

A subsequent series 280 of inputs may be captured by one or more vision sensors that may or may not be integral with a robot (not depicted in FIG. 2). Subsequent series 280 of inputs once again may be captured by the robot, for instance, while the robot maneuvers around an area such as a home or office looking for an object of interest, such as a trash bin. Each captured vision frame 284, and representation 282 if present, may be applied at step 2A as input across object location model 160 to generate output. Instead of the output indicating whether an instance of the object of interest (a trash bin) is detected in the vision frame, as was the case with FIG. 1, the output of object location model 160 may convey potential location(s) of an object of interest relative to the current vision frame 284. As noted previously, in some implementations, the output of object location model 160 may identify one or more surfaces in the portion of the environment captured in the input vision frame that potentially conceal, from a vantage point of the vision sensors, an instance of the object of interest. Additionally or alternatively, in some implementations, the output of object location model 160 may identify one or more other portions of the environment that are outside of the portion of the environment captured by the at least one visual frame and that potentially include an instance of the object of interest.

In some implementations, the output of object location model 160 may include (or be used to generate) annotations that represent a prediction, based on a posteriori knowledge gained from prior training of object location model 160, as to where the object of interest may be relative to the current vision frame 284. In FIG. 2, annotations that represent object location predictions are indicated with a trash bin drawn in dash-dot-dashed lines. For example, as the robot enters a room in which the robot will search for a trash bin, assume that no trash bin is yet visible. However, the vision frames 284 captured by the robot's vision sensors during this period will nonetheless be annotated based on output from object location model 160. These vision frames 184 may be persisted (at step 2B), e.g., in memory of the robot or elsewhere, as a "pre-detection" annotated group 280A of vision frames.

Unlike in FIG. 1, the annotations included in pre-detection annotated group 280A may be used by the robot to more quickly adjust its position and/or pose to locate a trash bin. For example, the annotations may identify a surface in the area that is likely to conceal a trash bin. Additionally or alternatively, the annotations may identify another portion of the environment, outside of the current vision frame 284, that likely contains a trash bin. Consequently, the robot is able to use these annotation to more quickly and efficiently adjust its position or pose until it locates a trash bin, assuming one is present. A dashed line in FIG. 2 labeled "OBJECT IN VIEW" represents a delineation between the pre-detection annotated group 280A of vision frames 284, in which no trash bin was yet detected (but annotations offered hints of likely locations), and a "during detection" group 280B of vision frames 284 in which at least enough of a trash bin is detected to cause output of object location model 160 to indicate detection of a trash bin at a particular location. As was the case with FIG. 1, in FIG. 2, during-detection group 280B of vision frames 184 generated from output of object location model 160 at step 2C include a picture of a trash bin to indicate that a trash bin was actually detected in the during-detection group 280B of vision frames 284 (again. this is for demonstration purposes only; trash bins may have a variety of different appearances and poses). Vision frames 284 of during-detection group 280B include a solid line depiction of a trash bin to signify that the trash bin is actually detected in the vision frame 284. After this point, based on the robot's own pose and/or localization knowledge, the location of the trash bin is known, as was the case in FIG. 1.

Suppose the robot once again continues to maneuver around the area until the trash bin is no longer in view. This is delineated in FIG. 2 by a second dashed line labeled "OBJECT OUT OF VIEW." When vision frames 284 captured after this point are applied at step 2A as input across object location model 160, the output generated at step 2D may include annotations or other information of potential locations of a trash bin. Thus, a "post-detection" annotated group 280C of vision frames 284 may be accumulated, e.g., in memory.

Similar to FIG. 1, at some point in time, e.g., after the trash bin's location is detected, one or more vision frames of groups 280A, 280B, and/or 280C may be provided to annotation engine 190 at step 2E. Annotation engine 190 may be configured to perform operations similar to those in FIG. 1 to generate annotations to vision frames in which the trash bin (or more generally, the object of interest) was not directly detected to indicate the (now known) location of trash bin relative to these vision frames.

As was the case in FIG. 1, in FIG. 2, vision frames 284 from pre-detection annotated group 280A and/or post-detection annotated group 280C may be (re)annotated, or other information may be generated such as a vision mask, to convey an actual location of the trash bin that is not otherwise visible in those vision frames 284. This is in contrast to the inferred annotations (in dash-dot-dashed lines) these vision frames 284 previously included. Consequently, at step 2F, a "labeled" group 280D of annotated vision frames 184 may be generated. In FIG. 2, the annotations representing the actual detected location of the trash bin are represented by a trash bin depicted in dashed lines, similar to FIG. 1.

Similar to step 1G of FIG. 1, at step 2G, this labeled group 280D of annotated vision frames 284 may be used as training examples to further train object location model 160. In sum, FIG. 1 depicts the process of generating initial training data to train object location model 160, e.g., before any a posteriori knowledge has been gained. FIG. 2 demonstrates how subsequent training data may continue to be generated for additional training of object location model 160. Thus, through the ongoing process depicted in FIG. 2, the a posteriori knowledge of object location model 160 continues to evolve.

Figure 3A:
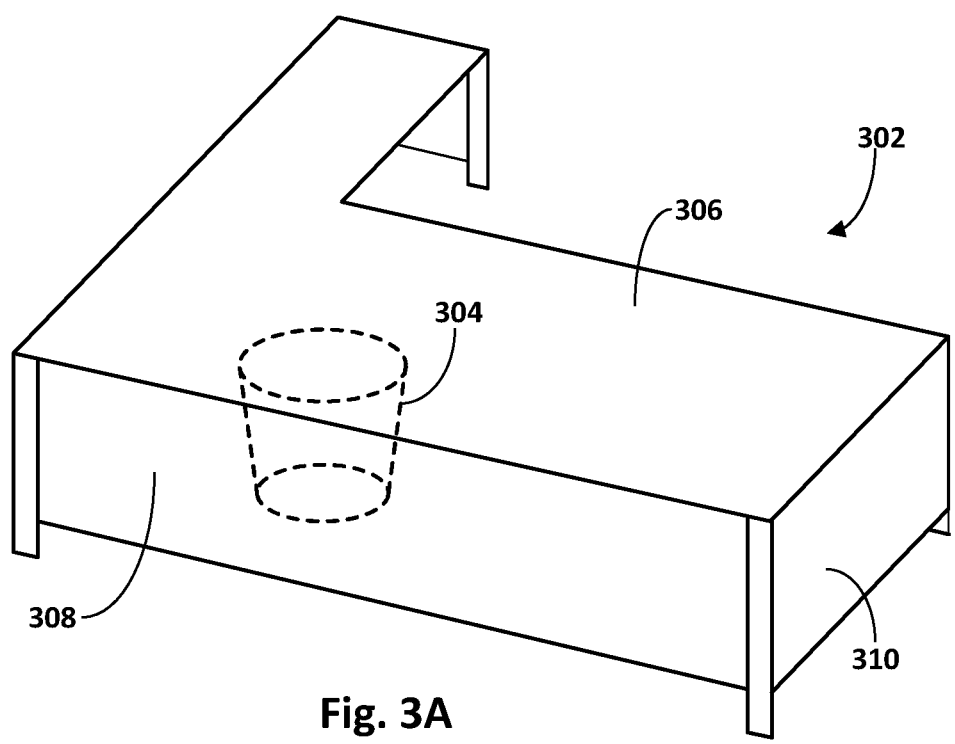
FIGS. 3A, 3B, 3C, and 3D depict examples of how vision frames may be annotated, in accordance with various implementations.

FIG. 3A depicts an example original vision frame 300 that may be captured by one or more vision sensors of a robot as the robot (not depicted) enters, for instance, an office. Vision frame 300 captures an L-shaped desk 302 that, unbeknownst to the robot, conceals a trash bin 304. Trash bin 304 is depicted in dashed lines because it is not visible from the vantage point of the one or more vision sensors of the robot. Desk 302 includes a top horizontal surface 306 (commonly referred to as a "desktop"), a first vertical surface 308, and a second vertical surface 310.

Figure 3B:
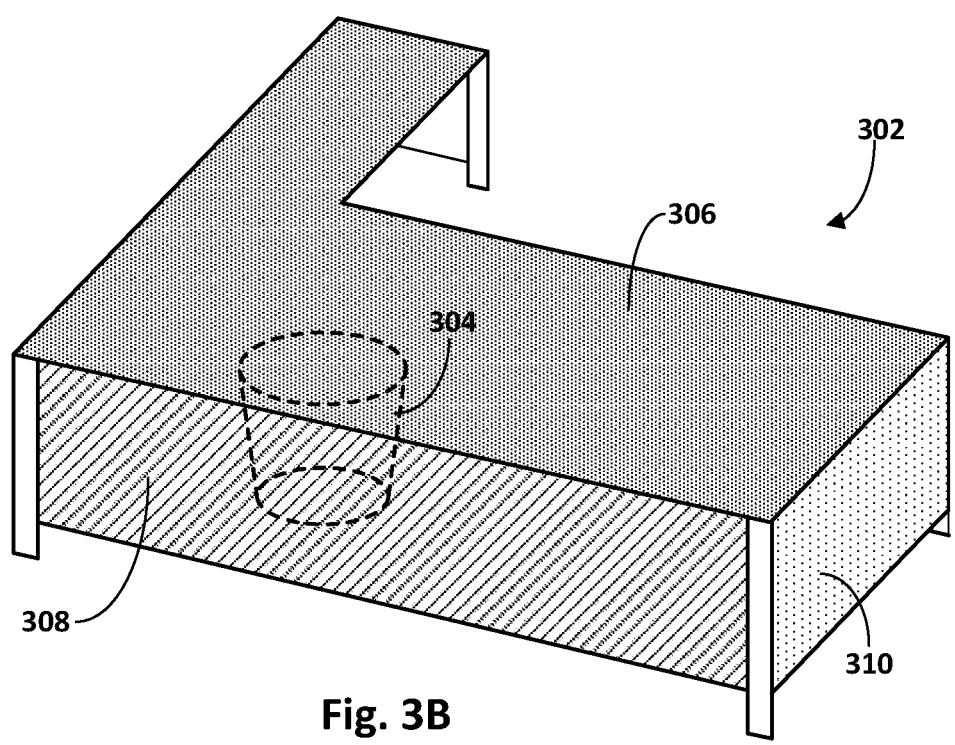

FIG. 3B depicts an annotated version 300' of vision frame 300 generated pursuant to techniques described herein. In particular, a posteriori knowledge of locations where trash bins are generally located is assumed to have been gained using techniques described herein. In this example, the a posteriori knowledge indicates that trash bins are often underneath desks. Accordingly, annotated version 300' of vision frame 300 is annotated to indicate likely locations of trash bin 304. For example, top horizontal surface 306, first vertical surface 308, and second vertical surface 310 are all filled with various patterns to indicate that each surface potentially conceals an instance of a trash bin. Each fill pattern may indicate, for instance, a probability that the surface conceals a trash bin. For example, there is a first likelihood that horizontal top surface 306 conceals a trash bin, a second, slightly lower probability that first vertical surface 308 conceals a trash bin, and a third, even lower probability that second vertical surface 310 conceals a trash bin. It should be understood that actual vision frames may be annotated differently than shown in FIG. 3B, and that the fill patterns are depicted for illustrative purposes only. For example, pixels of an actual vision frame, or corresponding portions of a mask frame, may be annotated by including indications of probabilities, e.g., within individual pixel channels, etc.

Now, suppose the robot uses the annotations depicted in FIG. 3 to maneuver intelligently to a position behind 302 desk at which the one or more vision sensors of the robot have a direct vantage point to trash bin 304, all the while continuing to capture the sequence of vision frames. This is opposed to the robot blindly and/or exhaustively searching the office for a trash bin. Once the robot "sees" trash bin 304, i.e. captures trash bin 304 in one or more vision frames captured by the one or more vision sensors, the actual location of trash bin is known. Any vision frames captured after this point may be annotated as described herein to indicate the location of trash bin. Moreover, any past vision frames captured by the robot prior to locating trash bin 304 may be annotated to indicate the determined location of trash bin 304.

Figure 3C:
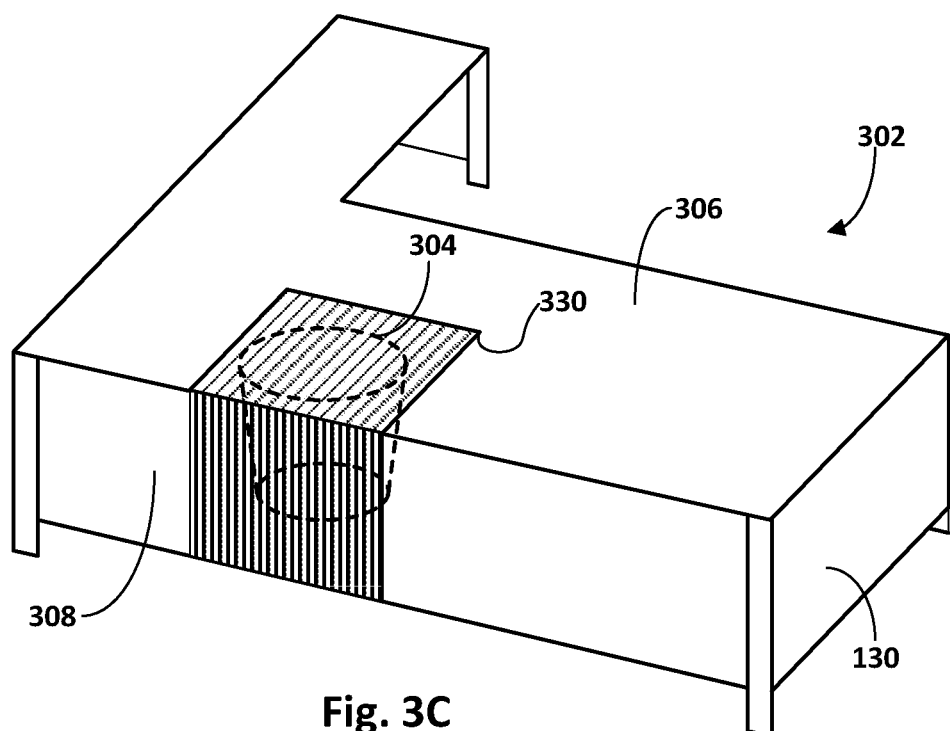

For example, in FIG. 3C, a new annotation 330 is projected onto new version 300" of vision frame 300 (recall that original vision frame 300 was captured previously). New annotation 330 is relatively precisely selected to indicate only those portions of top horizontal surface 306 and first vertical surface 308 that actually concealed trash bin 304 when robot first entered the office. Second vertical surface 310 is not annotated because it was discovered that, from the vantage point at which original vision frame 300 was captured, second vertical surface 310 did not conceal trash bin 304. In some implementations, new annotation 330 may be even more precisely selected than is depicted in FIG. 3C. For example, in some implementations, the known location and pose of trash bin 304—e.g., its outer contour and area within the outer contour—may be precisely projected onto top horizontal surface 306 and first vertical surface 308, so that new annotation 330 would more closely resemble an area corresponding to an outer contour of trash bin 304.

Figure 3D:
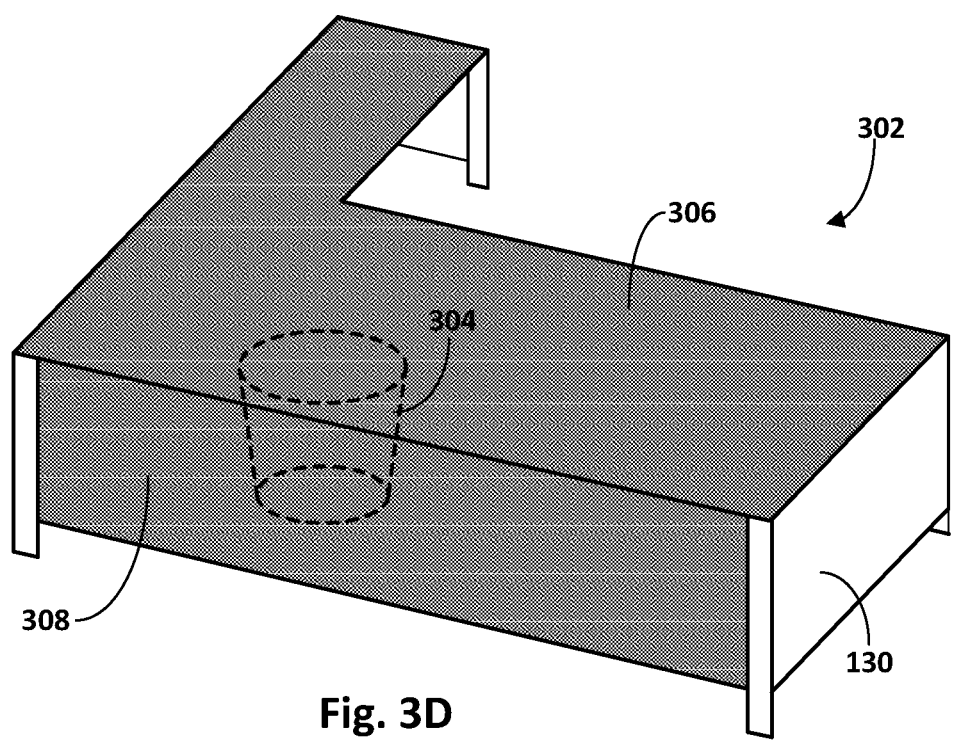

FIG. 3D depicts an alternative version 300''' that demonstrates another way original vision frame 300 may be annotated after discovering the location of trash bin 304. In FIG. 3D, the entireties of top horizontal surface 306 and first vertical surface 308 are filled with a relatively dense fill pattern to indicate that at least some portion of those surfaces concealed trash bin 304. Again, second vertical surface 310 is not annotated because it did not conceal trash bin from the vantage point of the vision sensor when original vision frame 300 was captured. And as noted above, the fill patterns of FIG. 3C are for demonstration purposes only. In actual practice, the pixels of original vision frame 300 itself (e.g., one selected channel, etc.) or a mask frame may be altered to convey the annotations.

Figure 4A:
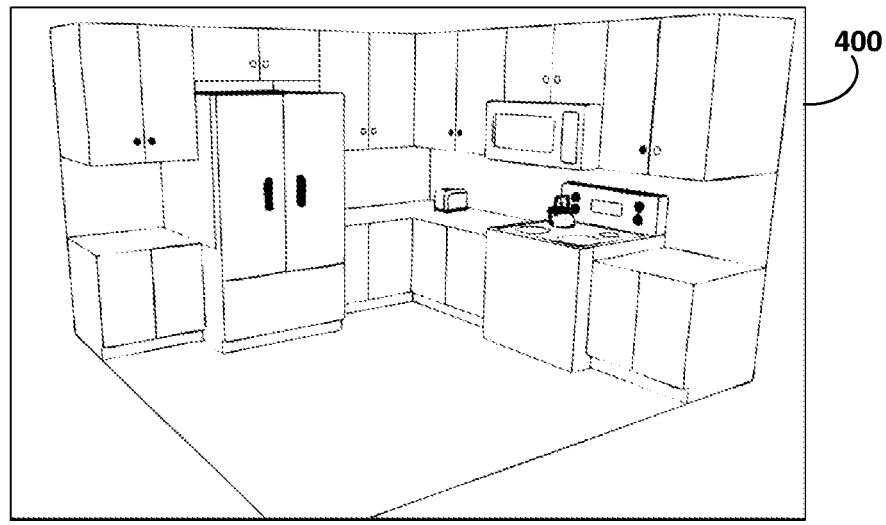
FIGS. 4A, 4B, and 4C depict more examples of how vision frames may be annotated, in accordance with various implementations.
Figure 4B:
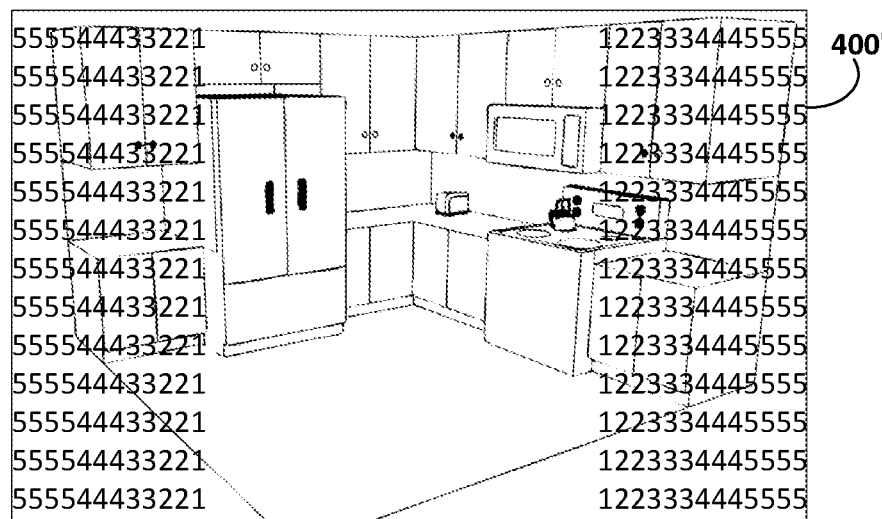
Figure 4C:
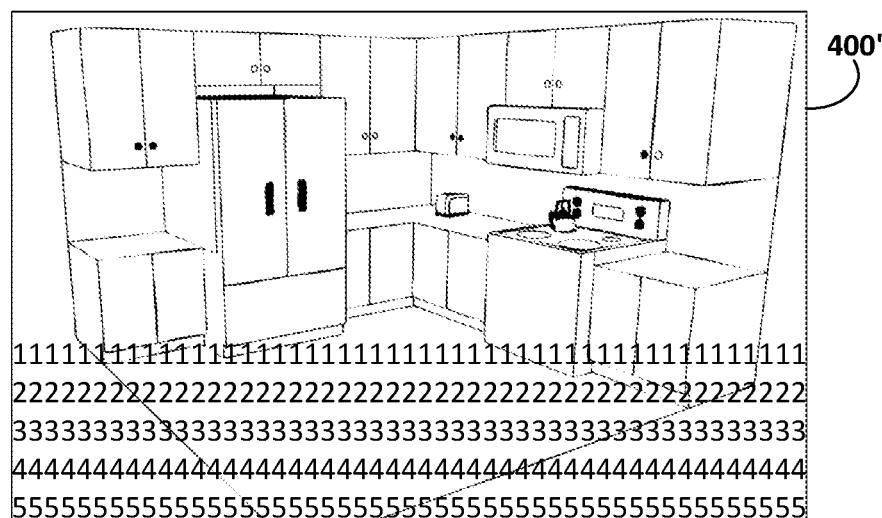

FIGS. 4A-C schematically demonstration another way that vision frames may be annotated using techniques described herein. FIG. 4A depicts an original, un-annotated vision frame 400 that depicts a kitchen. Vision frame 400 may be captured, for instance, by a vision component of a robot that is sent to the kitchen to perform a task such as "take all the dishes from the kitchen table to the sink."

In FIG. 4A, no kitchen table is visible. However, using techniques described herein, vision frame 400 may be applied as input across object location model 160 to determine information about where a kitchen table is likely to be located relative to the robot's current view. For example, in FIG. 4B, an annotated version 400' of original vision frame 400 is depicted that includes annotations in the form of numeric probabilities that, for instance, may be pixel-wise incorporated into vision frame 400. For purposes of illustration, these probabilities are depicted in FIG. 4B as the numbers 1-5. However, this is not meant to be limiting. In various embodiments, pixels (or groups or regions of pixels, for instance) may be labeled with different annotations, such as probabilities between zero and one, e.g., so that all probabilities add up to one.

In FIG. 4C, the probabilities near the sides of vision frame 400' are the largest, and they form a gradient that increases closer to the edge. This suggests that, based on a posteriori gained by object location model 160, a kitchen table is likely to be found on one side or the other from the robot's current vantage point. Thus, the robot could turn right or left and expect, at least with some likelihood, to find a kitchen table on one side or the other. FIG. 4C depicts a variation of 4B. In FIG. 4C, instead of the probabilities suggesting the kitchen table is to the right or left of the robot, the probability gradients suggest that an instance of a kitchen table is likely behind the robot. Thus, the robot may be more likely to rotate itself and/or its vision component 180 degrees as an initial movement.

Figure 5:
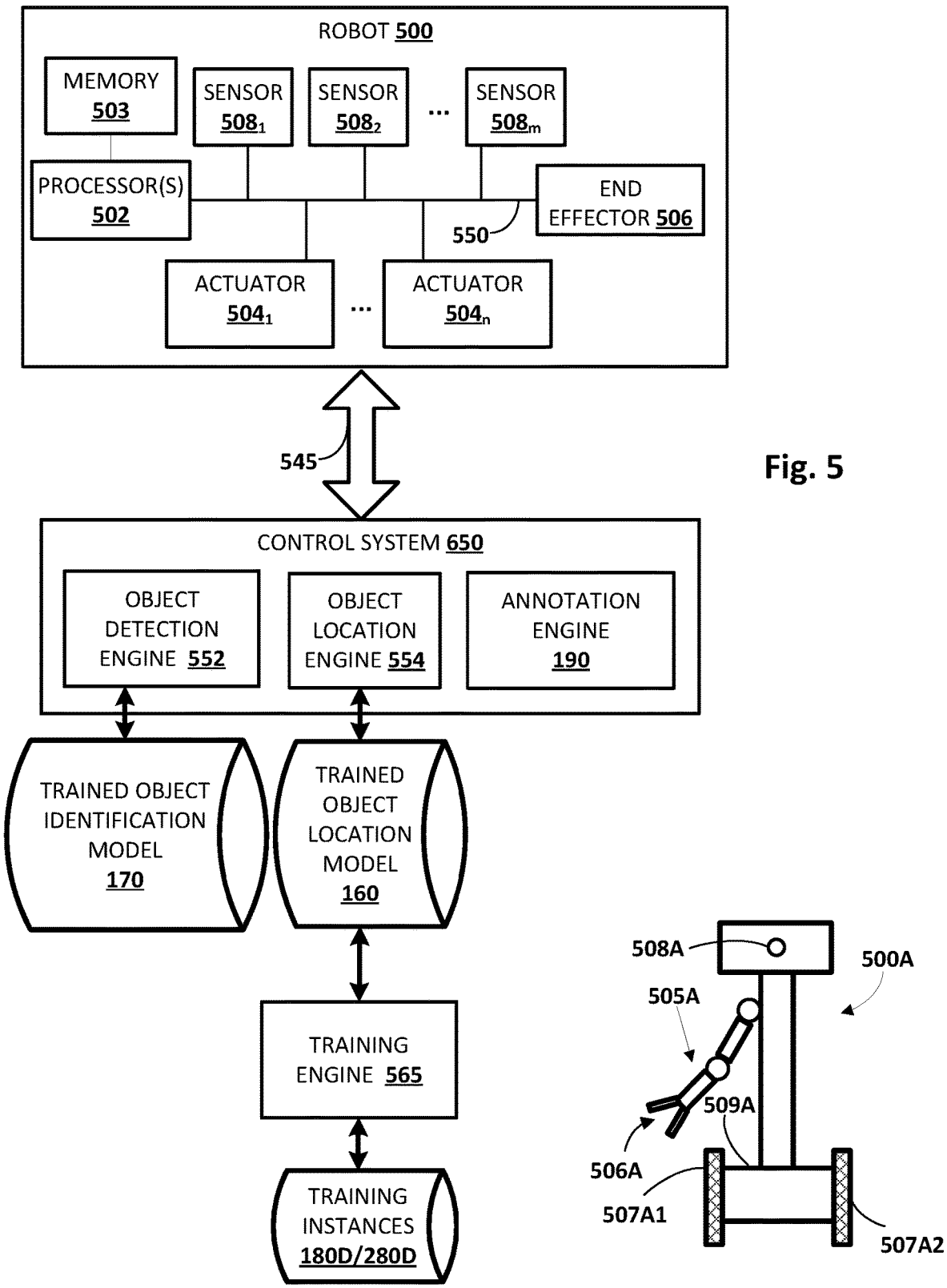
FIGS. 5 and 6 schematically depict an example environment in which disclosed techniques may be employed, in accordance with various implementations.

FIG. 5 illustrates an example environment in which various techniques disclosed herein may be implemented. A robot 500 is illustrated in FIG. 5. Robot 500 may take various forms, including but not limited to a telepresence robot, a robot arm, a humanoid, an animal, an insect, an aquatic creature, a wheeled device, a submersible vehicle, an unmanned aerial vehicle ("UAV"), and so forth. In various implementations, robot 500 may include one or more processors 502. Processor(s) 502 may take various forms, such as one or more CPUs, one or more GPUs, one or more field-programmable gate arrays ("FPGA"), and/or one or more application-specific integrated circuits ("ASIC"). In some implementations, the processor(s) 502 may be operably coupled with memory 503. Memory 503 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, processor(s) 502 may be operably coupled with one or more actuators $504_{1-n}$, at least one end effector 506, and/or one or more sensors $508_{1-m}$, e.g., via one or more buses 510. The robot 500 may have multiple degrees of freedom and each of the actuators $504_{1-n}$ may control actuation of the robot 500 within one or more of the degrees of freedom responsive to control commands. The control commands are generated by one or more of the processor(s) 502 and provided to the actuators $504_{1-n}$ (e.g., via one or more of the buses 510) to control the robot 500. As used herein, "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

As used herein, "end effector" may refer to a variety of tools that may be operated by robot 500 in order to accomplish various tasks. For example, some robots may be equipped with an end effector 506 that takes the form of a claw with two opposing "fingers" or "digits." Such a claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contiguitive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 506 may be removable, and various types of modular end effectors may be installed onto robot 500, depending on the circumstances.

Sensors $508_{1-m}$ may take various forms, including but not limited to vision components (e.g., laser scanners, stereographic cameras, monographic cameras), force sensors, pressure sensors, pressure wave sensors (e.g., microphones), proximity sensors (also referred to as "distance sensors"), torque sensors, barcode readers, radio frequency identification ("RFID") readers, accelerometers, gyroscopes, compasses, position sensors (e.g., odometer, a global positioning system), speedometers, edge detectors, and so forth. While sensors $508_{1-m}$ are depicted as being integral with robot 500, this is not meant to be limiting. In some implementations, sensors $508_{1-m}$ may be located external to, but may be in direct or indirect communication with, robot 500.

Also illustrated in FIG. 5, is a robot 500A, which is one non-limiting example of robot 500. The robot 500A includes robot arm 505A with a grasping end effector 506A, that takes the form of a gripper with two opposing actuable members. The robot 500A also includes a base 509A with wheels 507A1 and 507A2 provided on opposed sides thereof for locomotion of the robot 500A. The base 509A may include, for example, one or more motors for driving corresponding wheels 507A1 and 507A2 to achieve a desired direction, velocity, and/or acceleration of movement for the robot 500A.

The robot 500A also includes a vision component 508A. The vision component 508A includes one or more vision sensors and may be, for example, a stereographic camera, a monographic camera, or a laser scanner. Vision data (e.g., vision frames) described herein can be generated based on output from vision sensor(s) of the vision component 508A. For example, the output can be raw output from the vision sensor(s), or processed output. In some implementations, a stereographic camera includes two or more sensors (e.g., charge-coupled devices (CCDs)), each at a different vantage point. Vision data can be generated based on sensor data generated by the two sensors at a given instance, such as vision data that is a two-and-a-half-dimensional ("2.5D") (2D with depth) image, where each of the pixels of the 2.5D image defines an X, Y, and Z coordinate of a surface of a corresponding object, and optionally color values (e.g., R, G, B values) and/or other parameters for that coordinate of the surface. In some other implementations, a stereographic camera may include only a single sensor and one or more mirrors utilized to effectively capture sensor data from two different vantage points. A monographic camera can include a single sensor and captures two-dimensional ("2D") vision data. A laser scanner includes one or more lasers that emit light and one or more sensors that generate vision sensor data related to reflections of the emitted light. The vision data generated based on sensor output from a laser scanner may be 2.5D point cloud data. A laser scanner may be, for example, a time-of-flight laser scanner or a triangulation based laser scanner and may include a position sensitive detector (PSD) or other optical position sensor. In some implementations, vision data can be a voxel map as described herein. In some of those implementations, the voxel map is generated by processing of multiple instances of vision data. For example, multiple 2.5D images and/or multiple 2.5D instances of point cloud data from multiple different vantages can be processed to generate a voxel map of at least a portion of an environment of a robot.

As described herein, robot 500A may operate autonomously at least part of the time and control actuators thereof in performance of various actions. For example, in performing various actions, one or more processors of the robot 500A may provide control commands to actuators associated with the wheels 507A1 and/or 507A1, the robot arm 505A and/or the end effector 506A. Further, in various situations the control commands provided at a given instance can be generated based at least in part on object detection as described herein.

Control system 550 is also illustrated in FIG. 5. Control system 550 includes an object identification engine 552, an object location engine 554, and the aforementioned annotation engine 190. Although the control system 550 is illustrated separate from the robot 500 in FIG. 5, connection arrow 545 indicates that the control system 550 can be implemented on robot 500 and/or can be in network communication (e.g., via a local area network and/or a wide area network) with robot 500. For example, in some implementations, one or more (e.g., all) of the engines of the control system 550 are implemented by hardware that is local to the robot 500, such as one or more of the processors 502. Such processor(s) that implement one or more of the engines may optionally be separate from the processor(s) that generate and/or provide control commands to actuators 504 of the robot 500. For example, aspects of the control system 550 may be implemented by one or more processors that do not operate in a real-time domain of the robot 500, whereas other processor(s) that do operate in the real-time domain generate and provide control commands to actuators 504$_{1-n}$. In some implementations, one or more (e.g., all) of the engines of the control system 550 are implemented by hardware that is separate from the robot 500. For example, engine(s) may be implemented "in the cloud" by a remote cluster of high performance computing devices and/or by one or more computing devices that are separate from the robot 500, but that are geographically proximal to the robot (e.g., in the same building). In implementations where robot 500 and one or more aspects of control system 550 are separate, they may communicate over one or more wired or wireless networks (not depicted) or using other wireless technology, such as radio, Bluetooth, infrared, etc.

The object detection engine 552 receives vision data, e.g., vision frames, that is generated based on output from one or more vision components of the sensors 508$_{1-m}$. The object detection engine 552 uses the aforementioned trained object identification model 170 to process the received vision data to generate output that defines object detection for one or more objects captured by the vision data. For example, the received vision data can be a two-dimensional vision frame and object detection engine 552 can process the vision frame using trained object identification model 170 to generate output that identifies one or more objects detected in the vision frame. The output can, for instance, identify a corresponding spatial region that corresponds to a portion of the vision frame (e.g., to a single pixel, or to a collection of contiguous pixels). In some implementations, indication of a detected object is expressed by a probability, in the output, that corresponds to the spatial region that corresponds to the detected object.

Similarly, the object location engine 554 receives vision data, e.g., vision frames, that is generated based on output from one or more vision components of the sensors 508$_{1-m}$. The object location engine 554 uses the aforementioned trained object location model 160 to process the received vision data to generate output that, for instance, includes annotations about predicted object locations in an environment, as described above. For example, the received vision data can be a two-dimensional vision frame and object location engine 554 can process the vision frame using trained object location model 160 to generate output that identifies one or predicted locations of an object of interest. The output can, for instance, identify a spatial region that corresponds to a portion of the vision frame (e.g., to a single pixel, or to a collection of contiguous pixels). In some implementations, indication of a likely object location is expressed by a probability, in the output, that corresponds to the spatial region that corresponds to the predicted object location.

Also as illustrated in the environment of FIG. 5 is a training engine 565 and training instances 180D/280D that corresponds to (e.g., stores) the labeled group 180D of annotated vision frames 184 in FIG. 1 the labeled group 280D of annotated vision frames 284 in FIG. 2. The trained object location model(s) 170 can be trained by the training engine 565 utilizing training instances from training instances database 180D/280D. A training engine may also be present for trained object identification model 170 and object detection engine 552, but is not depicted in FIG. 5.

Figure 6:
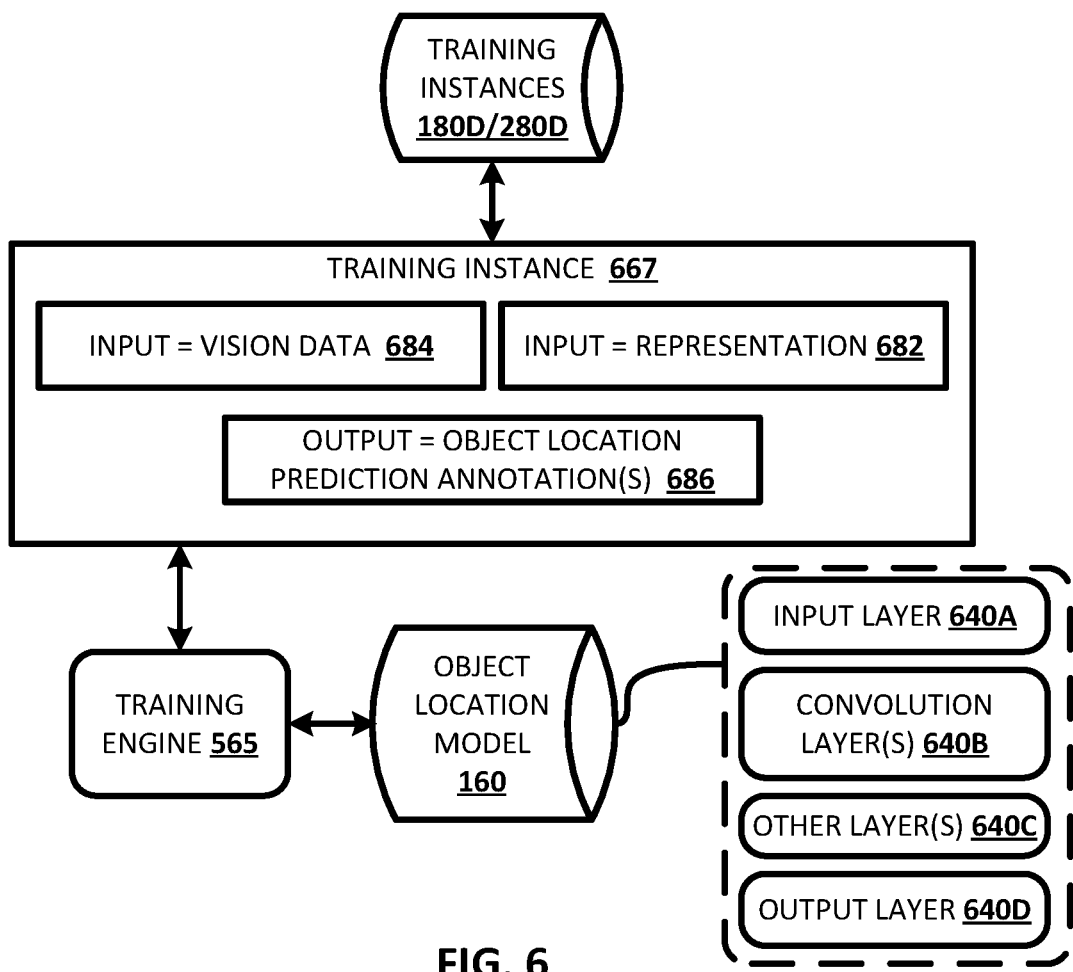

With reference to FIG. 6, additional description is provided of the training engine 565, the training instances 180D/280D, and the trained object location model 160. FIG. 6 illustrates an example training instance 667 of the training instances 180D/280D, and how the training engine 565 can utilize the training instance 667 to train the object location model 160, which in this example may be a neural network such as a convolutional neural network. As was the case in FIGS. 1 and 2, the training instance 667 includes a first training instance input 682 that includes a representation of an object of interest and a second training instance input 684 that includes vision data. As noted previously, the representation 682 may take various forms of data that represents the object of interest, such as a reduced-dimensionality embedding (e.g., a feature-rich vector), one or more template images of the object of interest, a two- or three-dimensional model of the object of interest, etc. Also as noted previously, the vision data 684 of training instance input 681 can be, for example, a 2D vision frame, a 2.5D vision frame, or a 3D voxel map. For example, the vision data can be a 2.5D vision frame captured by a stereo camera and have, for example, 512×512 pixels with four channels. The four channels can define red, green, blue, and depth values for each of the pixels. As another example, the vision data can be a 3D voxel map generated based on sensor output captured by a stereo camera and/or laser scanner from multiple vantages.

The training instance 667 also includes a training instance output 686, that conveys information about one or more predicted locations of the object of interest. In some implementations, this information may include annotations, such as the pixel-wise and/or voxel-wise annotations described previously. In training the object location model 160, the training engine 665 applies the training instance input, 682 and 684, to object location model 160, and processes the training instance input 667, utilizing object location model 160 and based on current parameters of object location model 160, to generate an output having a dimension that, for instance, conforms to the dimension of training instance output 686. The training engine 565 then compares the generated output to the training instance output 686, and updates one or more parameters of object location model 160 based on the comparison. For example, the training engine 565 can generate an error based on differences between the generated output and the training instance output 686, and backpropagate the error through object location model 160 to update the model. Although only a single training instance 667 is illustrated in FIG. 6, object location model 160 will be trained based on a large quantity of training instances from groups 180D/280D. Those training instances can collectively include training instance input with diverse vision data (e.g., multiple diverse objects, varied lighting/other environmental parameters, etc.). Moreover, although a non-batch training example is described, batch training may additionally or alternatively be utilized.

FIG. 6 also illustrates, within dashed lines, example layers that may be included in object location model 160. In particular, an input layer 170A, convolution layer(s) 170B, other layer(s) 170C, and an output layer 170D are illustrated. As described herein, the dimensions/shape of the input layer 170A can be dependent on the shape of the vision data to be applied. In some implementations, multiple convolution layer(s) 170B are provided, and max pooling and/or other layers may optionally be interposed between one or more of the convolution layer(s) 170B. The other layer(s) 170C can include such max pooling layers and/or layers such as a softmax layer(s) and/or fully connected layer(s) that precede the output layer 170D.

Figure 7:
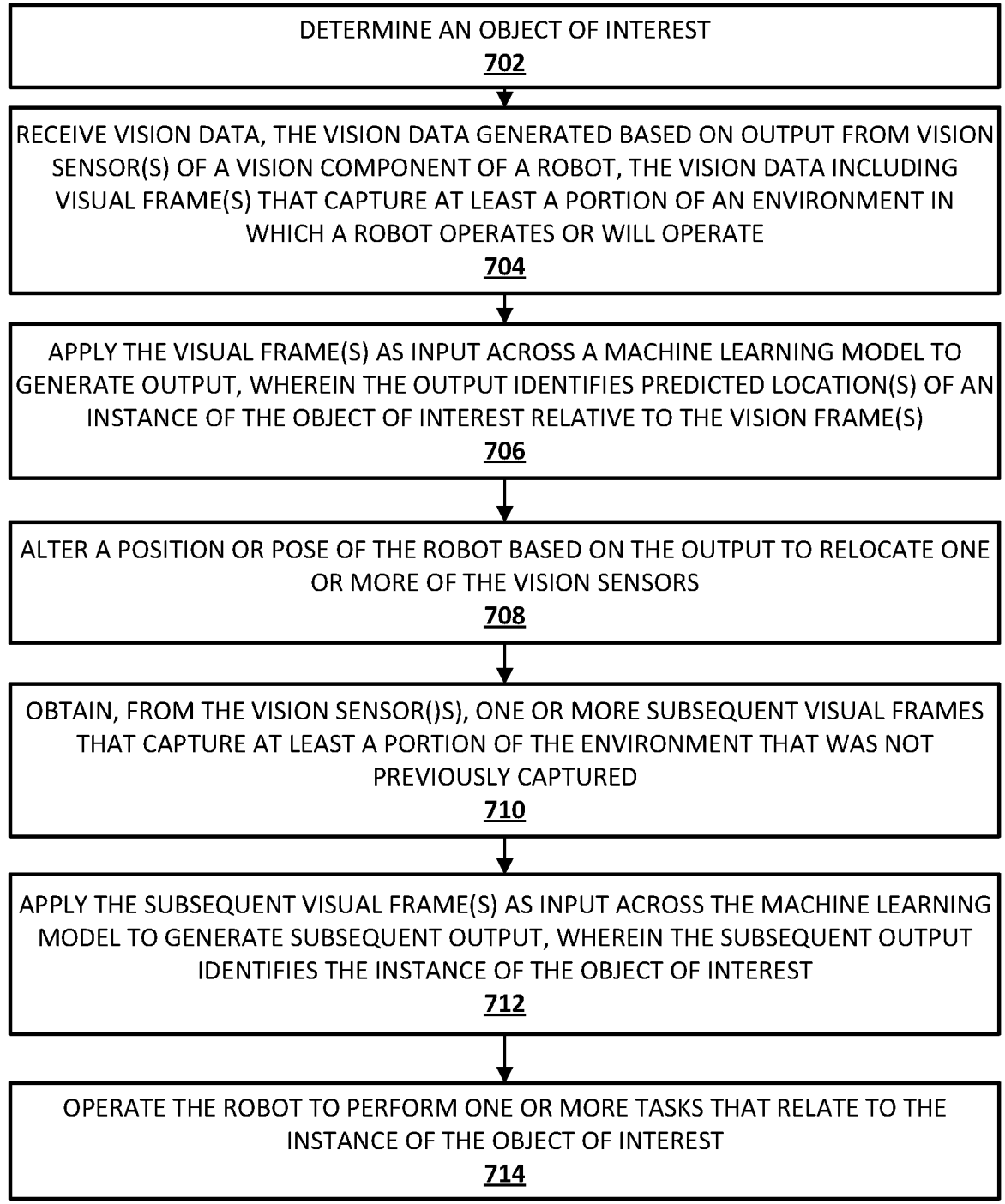
FIGS. 7 and 8 depict example methods for practicing selected aspects of the present disclosure, in accordance with various implementations.

FIG. 7 depicts an example method 700 for practicing selected aspects of the present disclosure, in accordance with various embodiments. For convenience, the operations of the flow chart are described with reference to a system that performs the operations. This system may include various components of various computer systems, including training engine 565, annotation engine 190, object detection engine 552, and/or object location engine 554. Moreover, while operations of method 700 are shown in a particular order, this is not meant to be limiting. One or more operations may be reordered, omitted or added.

At block 702, the system may determine an object of interest. For example, a user may provide one or more instructions to a robot (e.g., 500) and/or to a robot control system (e.g., 550) to locate one or more instances of an object of interest, e.g., to act upon the instance in some way. In the examples described above, the object of interest was a trash bin. Example instructions that may be issued by a user for a robot to interact with a trash bin include, for instance, "take the rubbish to the nearest trash bin," "empty all trash bins in the house into the outdoor trash can," etc. Any number of other robot commands can be envisioned that may take advantage of the efficient objection location facilitated using techniques described herein. For example, a user may instruct a robot to "take all the dishes from the table to the sink," "pick up all the toy blocks in the room and place them in a toy chest," etc.

As alluded to previously, in some implementations, objects of interest may already be known (e.g., trained into object identification model 160 and/or object location model 160), especially common household items, items found in offices or other environments, etc. However, users may be able to train models 160/170 to identify heretofore unknown objects, e.g., specific toys, custom created objects (e.g., sculptures, homemade trash bins, homemade furniture), or other objects that may not be as widespread, such as small batch liquor bottles, uncommon dishware, uncommon furniture, etc. For example, a user may cause multiple vision frames of an unknown object to be captured, e.g., manually using a camera and/or by causing a robot to take the multiple frames. The user may provide input that identifies the object. In some implementations, an embedding may be learned from the object using one or more of these vision frames. This embedding may, in the form of a representation of the object (e.g., 182, 282), be applied as input, e.g., along with new vision frames (e.g., 184, 284), across object identification model 170 and/or object location model 160, to identify and/or locate an instance of the now-known object of interest.

Referring back to FIG. 7, at block 704, the system may receive vision data, e.g., from one or more vision sensors (e.g., 508A) of a vision component of a robot (e.g., 500A). In various implementations, the vision data may include one or more visual frames that capture at least a portion of an environment in which a robot operates or will operate. For example, the one or more visual frames may include frames captured prior to detection of an instance of an object of interest, during detection of the object of interest, and after detection of the object of interest.

At block 706, the system may apply one or more of the visual frames as input across one or more machine learning models, such as one or more convolutional neural networks, to generate output. In some implementations, the output may identify, e.g., using pixel-wise or voxel-wise annotations, one or more predicted locations of an object of interest relative to the input vision frame. For example, in some implementations, the output may identify one or more surfaces in the portion of the environment captured in the vision frame that potentially conceal, from a vantage point of the one or more vision sensors, an instance of the object of interest. Examples of such output were depicted in FIGS. 3A-D. Additionally or alternatively, in some implementations, the output may identify one or more other portions of the environment that are (i) outside of the portion of the environment captured by the input visual frame and (ii) potentially include an instance of the object of interest. Examples of such output were depicted in FIGS. 4A-C.

In some implementations, the system may apply a vision frame as input across multiple machine learning models, e.g., both object location model 160 and object identification model 170, in series and/or in parallel. For example, the system may apply the vision frame as input across the object location model 160 first, to learn predicted locations at which an instance of the object of interest is likely to be located. As noted above this can be behind one or more depicted surfaces and/or off frame, e.g., to either side, behind, above, etc. Meanwhile, the vision frame may also be applied as input across object identification model 170 to determine whether an actual instance of the object is detected. Additionally or alternatively, in some implementations, only object location model 160 may be employed to both efficiently locate and eventually detect an instance of an object of interest. In some such implementations, when the object is detected, pixels that map to a detected location of the object may be set to a high probability, such as 1.0, and pixels that do not map to the detected location of the object may be set to a lower probability, such as zero.

At block 708, the system may alter a position or pose of the robot based on the output, e.g., of object location model 160, to capture at least a portion of the environment that was not previously captured. For example, in some implementations, the robot may maneuver and/or adjust its pose to relocate one or more of the vision sensors to have a direct view behind one or more of the surfaces that was identified as potentially concealing an instance of the object of interest. Additionally or alternatively, the robot may maneuver and/or adjust its pose to relocate one or more of the vision sensors to capture another portion of the environment off to the side, above, below, etc., that was not previously captured in a vision frame but was indicated as likely containing an instance of the object of interest.

At block 710, the system may receive, from one or more of the vision sensors of the vision component, one or more subsequent visual frames that capture at least a portion of the environment that was previously either concealed by the one or more surfaces that were identified as potentially concealing an instance of the object of interest, or a portion of the environment that was not previously captured because it was off frame.

At block 712, similar to block 706, the system may apply one or more of the subsequent visual frames as input across the machine learning model(s) to generate subsequent output. Assuming the robot now has a direct view of an instance of the object of interest, the subsequent output may identify the instance of the object of interest. As was the case above, this application of the machine learning model may include both models 160 and 170, or only model 170, depending on the implementation. At block 714, the system may operate the robot to perform one or more tasks that relate to the instance of the object of interest (e.g., placing trash in a located trash bin, putting toys in a located toy chest, moving located furniture to new location, repositioning the object of interest, etc.).

Figure 8:
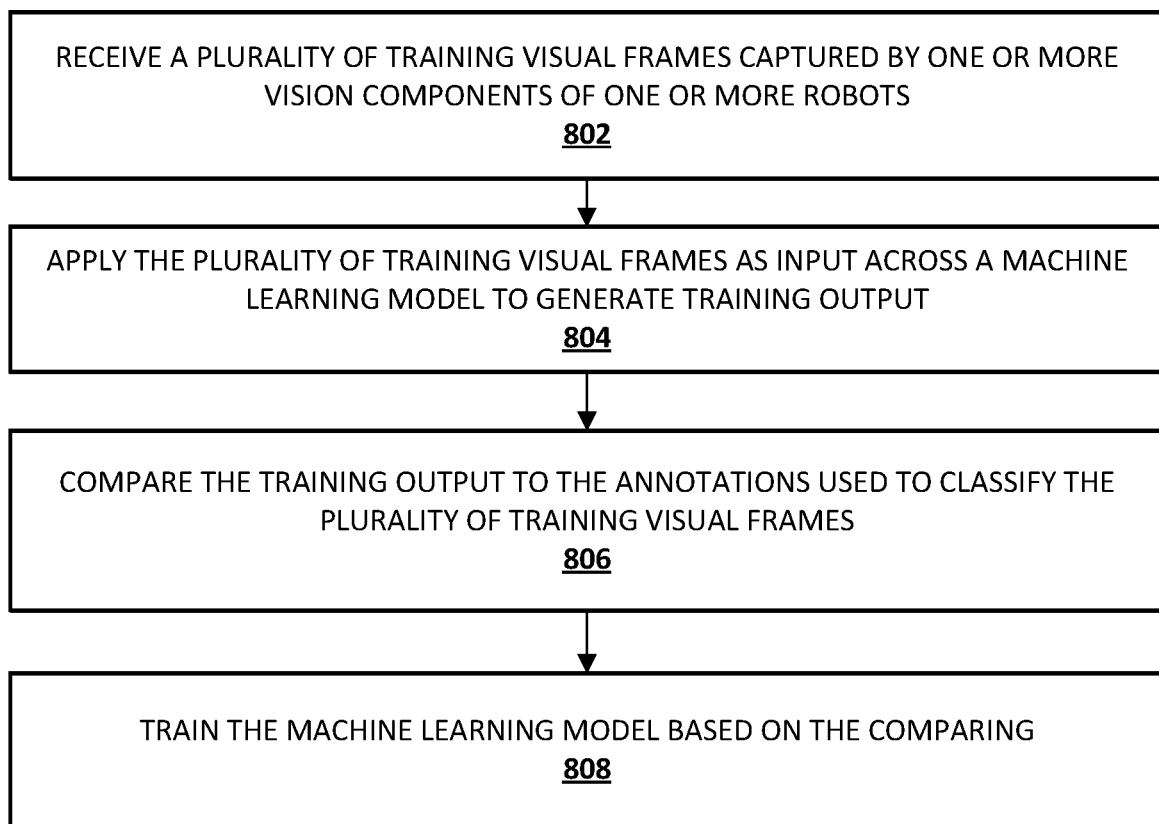

FIG. 8 depicts an example method 8 for practicing selected aspects of the present disclosure, namely, training object location model 160, in accordance with various embodiments. For convenience, the operations of the flow chart are described with reference to a system that performs the operations. This system may include various components of various computer systems, including training engine 565. Moreover, while operations of method 800 are shown in a particular order, this is not meant to be limiting. One or more operations may be reordered, omitted or added.

At block 802, the system may receive a plurality of training visual frames captured by one or more vision components of one or more robots. These training vision frames may include, for instance, vision frames from labeled groups 180D (prior to initial training of object location model 160) and/or 280D (ongoing training of object location model 160). These may be captured by one or more robots as the robots initial maneuver through environments, e.g., while they perform simultaneous location and mapping ("SLAM").

At block 804, the system may apply the plurality of training visual frames as input across a machine learning model, such as object location model 160, to generate training output. At block 806, the training output may be compared to the annotations used, e.g., by annotation engine 190, to classify the plurality of visual frames. The difference between the output of the machine learning model and the annotations may be used, at block 808, to train the machine learning model. For example, techniques such as back propagation, stochastic gradient descent, and/or batch gradient descent may be applied to modify one or more weights or other parameters associated with one or more hidden layers of a convolutional neural network.

Figure 9:
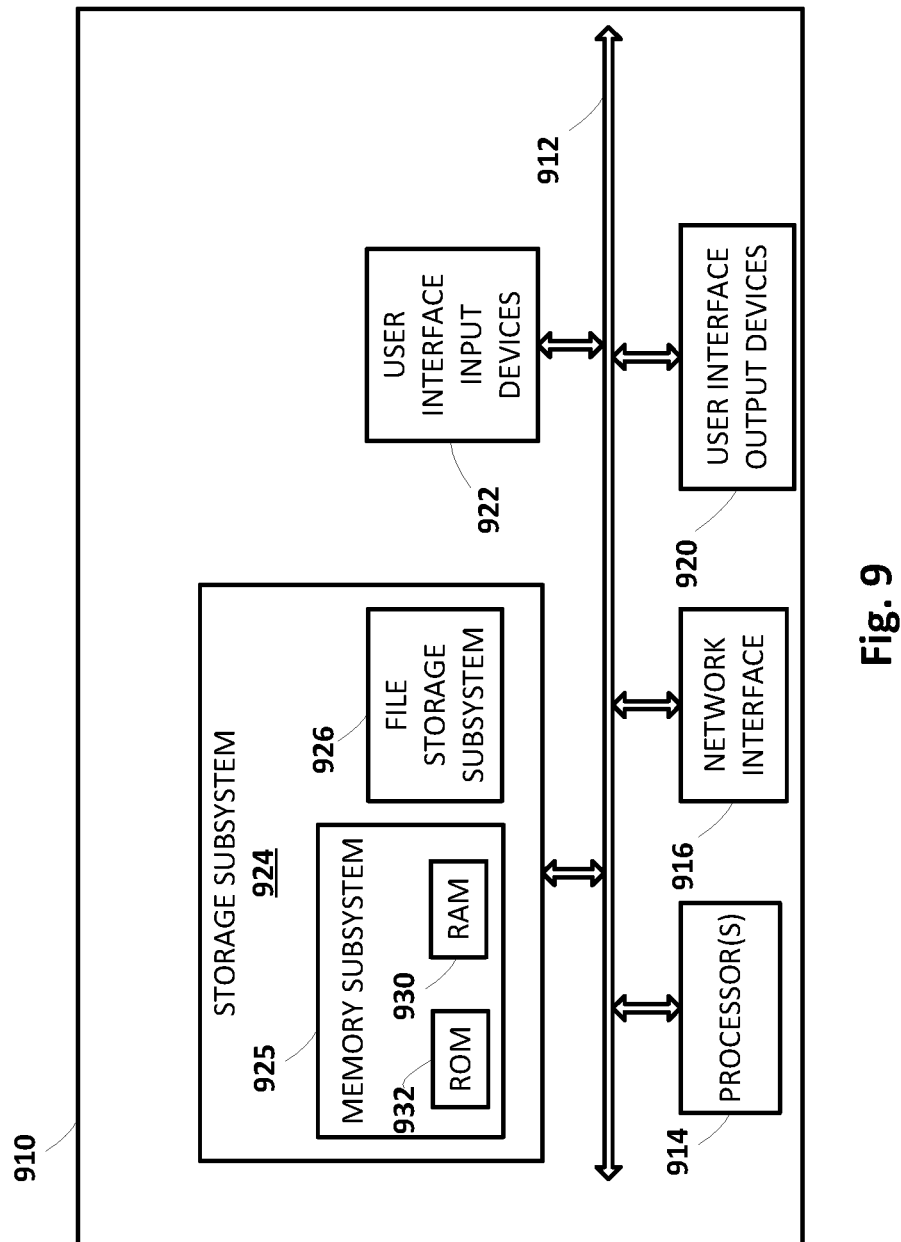
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of methods 700 and/or 800, and/or to implement one or more components depicted in the various figures. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a CD-ROM drive, an optical drive, or removable media cartridges. Modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

receiving a plurality of training visual frames captured by one or more vision sensors, wherein at least a first subset of the plurality of training visual frames do not directly capture an instance of an object of interest and at least a second subset of the plurality of training visual frames directly capture an instance of the object of interest, and each given training visual frame of the plurality of training visual frames is classified with one or more annotations that are indicative of whether an instance of the object of interest is present in an area captured in the given training visual frame;

applying the plurality of training visual frames as input across a machine learning model to generate training output;

comparing the training output to the annotations used to classify the plurality of training visual frames; and training the machine learning model based on the comparing, wherein output generated based on the trained machine learning model is usable to narrow a search space in which a robot seeks an instance of the object of interest.

2. The method of claim 1, wherein the plurality of training visual frames comprise a temporally-ordered sequence of visual frames that were captured by one or more of the vision sensors.

3. The method of claim 1, wherein each training visual frame of the first subset of the plurality of training visual frames is classified with respective one or more annotations that indicate a depicted surface behind which the instance of the object of interest is concealed.

4. The method of claim 3, wherein the one or more annotations include one or more probabilities that a plurality of pixels representing the depicted surface conceal an instance of the object of interest.

5. The method of claim 4, wherein the one or more probabilities include a plurality of pixel-wise probabilities.

6. The method of claim 1, wherein the one or more annotations include voxel-wise probabilities.

7. The method of claim 1, wherein the first subset of the plurality of training visual frames are initially classified with annotations indicating that an instance of the object of interest is not present in respective areas captured by the first subset of the plurality of training visual frames.

8. The method of claim 7, further comprising, based on the second subset of the plurality of training visual frames, reclassifying the first subset of the plurality of training visual frames with annotations indicating that the instance of the object of interest is present in the respective areas.

9. A method implemented by one or more processors, comprising:

receiving a plurality of training visual frames captured by one or more vision sensors, wherein at least a first subset of the plurality of training visual frames do not directly capture an instance of an object of interest and at least a second subset of the plurality of training visual frames directly capture an instance of the object of interest, and each given training visual frame of the plurality of training visual frames is classified with one or more annotations that are indicative of whether an instance of the object of interest is present in an area captured in the given training visual frame;

applying the plurality of training visual frames as input across a machine learning model to generate training output;

comparing the training output to the annotations used to classify the plurality of training visual frames; and training the machine learning model based on the comparing, wherein output generated based on the trained machine learning model is usable to narrow a search space in which a robot seeks an instance of the object of interest.

10. The method of claim 9, wherein the plurality of training visual frames comprise a sequence of temporally-ordered visual frames that is captured by a vision sensor of a robot as it is maneuvered around an environment.

11. The method of claim 10, wherein each training visual frame of the first subset of the plurality of training visual frames is classified with respective one or more annotations that indicate a direction outside of the training visual frame that includes an instance of the object of interest.

12. The method of claim 11, wherein the first subset of the plurality of training visual frames are initially classified with annotations indicating that an instance of the object of interest is not present in respective areas captured by the first subset of the plurality of training visual frames.

13. The method of claim 12, further comprising, based on the second subset of the plurality of training visual frames, reclassifying the first subset of the plurality of training visual frames with annotations indicating that an instance of the object of interest is present in the respective areas.

14. The method of claim 11, wherein the one or more annotations include pixel-wise probabilities that pixels of the given training visual frame depict a portion of an instance of the object of interest.

15. The method of claim 11, wherein the one or more annotations include voxel-wise probabilities.

16. A system comprising one or more processors and memory storing instructions that, in response to execution of the instructions by the one or more processors, cause the one or more processors to:

determine an object of interest;

receive vision data, the vision data generated based on output from one or more vision sensors of a vision component of a robot, the vision data including one or more visual frames that capture at least a portion of an environment in which a robot operates or will operate;

apply one or more of the visual frames as input across a machine learning model to generate output, wherein the output identifies one or more probabilities that a plurality of pixels representing one or more surfaces in the portion of the environment captured in the one or more visual frames conceal, from a vantage point of the one or more vision sensors, an instance of the object of interest; and alter a position or pose of the robot based on the output to relocate one or more of the vision sensors to have a direct view behind one or more of the surfaces;

wherein the machine learning model was trained using one or more annotated vision frames in which a portion of a surface of the annotated vision frame is annotated as concealing another object of interest of a same type as the object of interest.

17. The system of claim 16, wherein the machine learning model comprises a convolutional neural network.

18. The system of claim 16, wherein the input applied across the machine learning model includes a reduced dimensionality embedding of the object of interest.

19. The system of claim 16, wherein the one or more probabilities comprise pixel-wise probabilities.

20. The system of claim 16, wherein the one or more probabilities comprise voxel-wise probabilities.

* * * * *